United States Patent
Dai et al.

(10) Patent No.: US 11,453,607 B2
(45) Date of Patent: Sep. 27, 2022

(54) PROCESS FOR ENHANCED ANAEROBIC DIGESTION OF SLUDGE BY ALCOHOLIZATION OF FOOD WASTE

(71) Applicant: Tongji University, Shanghai (CN)

(72) Inventors: Xiaohu Dai, Shanghai (CN); Lei Li, Shanghai (CN); Jun Gao, Shanghai (CN); Ying Xu, Shanghai (CN); Bin Dong, Shanghai (CN); Lingling Dai, Shanghai (CN); Zhigang Liu, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 9 days.

(21) Appl. No.: 17/101,612

(22) Filed: Nov. 23, 2020

(65) Prior Publication Data
US 2022/0064043 A1 Mar. 3, 2022

(30) Foreign Application Priority Data

Aug. 31, 2020 (CN) .......................... 202010893337.5

(51) Int. Cl.
*C02F 11/04* (2006.01)
*C02F 3/34* (2006.01)
*C02F 1/36* (2006.01)
*C02F 1/46* (2006.01)
(Continued)

(52) U.S. Cl.
CPC .............. *C02F 11/04* (2013.01); *C02F 3/347* (2013.01); *C02F 1/36* (2013.01); *C02F 1/46* (2013.01); *C02F 1/78* (2013.01); *C02F 2103/32* (2013.01); *C02F 2203/00* (2013.01); *C02F 2303/06* (2013.01)

(58) Field of Classification Search
CPC .. C02F 11/04; C02F 3/347; C02F 1/36; C02F 1/46; C02F 1/78; C02F 2103/32; C02F 2203/00; C02F 2303/06
USPC .......... 210/603, 612, 613, 631, 632, 748.01, 210/748.02, 758, 760
See application file for complete search history.

(56) References Cited

U.S. PATENT DOCUMENTS

| 7,524,418 | B2 * | 4/2009 | Hirl | ........................... C12P 7/06 210/603 |
| 2005/0252858 | A1 * | 11/2005 | Peyton | ................. B01D 61/022 210/650 |

(Continued)

*Primary Examiner* — Fred Prince
(74) *Attorney, Agent, or Firm* — M&B IP Analysts, LLC.

(57) ABSTRACT

A process for enhanced anaerobic digestion of sludge by alcoholization of food waste, comprising steps of: (1) ethanol prefermentation of food waste—feeding the food waste having been crushed into a uniform grain size into an ethanol production reactor, where the food waste is subjected to rapid and efficient anaerobic fermentation activated by addition of yeast and pH adjustment to produce ethanol and obtain a fermentation broth and a fermentation residue; (2) sludge pretreatment—pretreating the sludge after mixing with the fermentation residue; and (3) methanogenesis of anaerobic digestion—subjecting products resulting from the sludge pretreatment to be mixed with the fermentation broth and then to methanogenesis of anaerobic digestion in a methane production reactor. With this process, the sludge and the food waste can be treated efficiently via multi-phase reactions, and the resource recovery and biogas quality can be enhanced.

10 Claims, 1 Drawing Sheet

(51) Int. Cl.
*C02F 1/78* (2006.01)
*C02F 103/32* (2006.01)

(56) References Cited

U.S. PATENT DOCUMENTS

| | | | |
|---|---|---|---|
| 2005/0266540 A1* | 12/2005 | Offerman | C07C 27/22 |
| | | | 435/161 |
| 2009/0250401 A1* | 10/2009 | Kotelko | C12P 5/023 |
| | | | 210/695 |
| 2011/0039318 A1* | 2/2011 | Lehr | C12P 19/02 |
| | | | 435/161 |
| 2017/0058300 A1* | 3/2017 | Aurandt | C12P 5/023 |

* cited by examiner

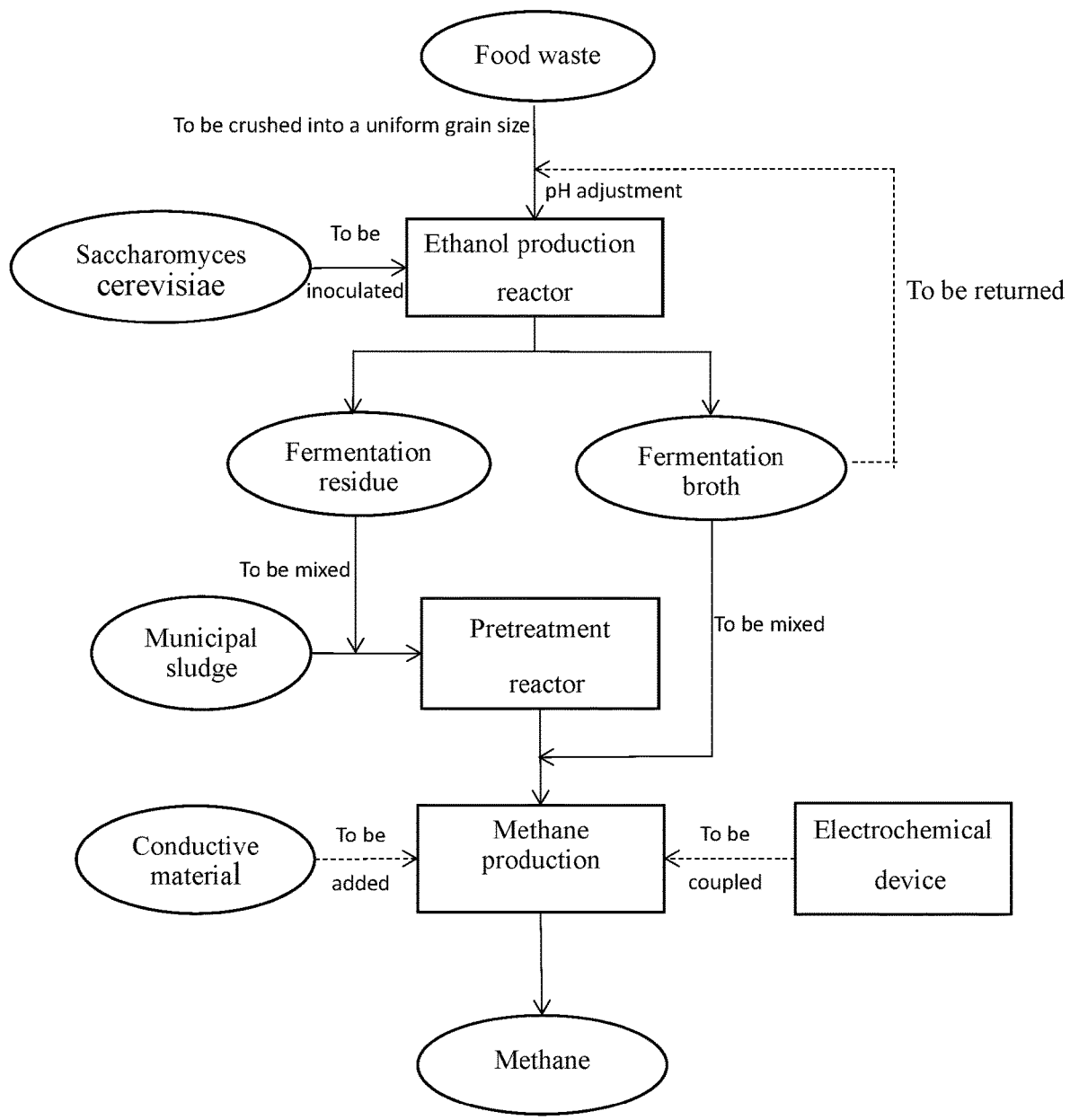

PROCESS FOR ENHANCED ANAEROBIC DIGESTION OF SLUDGE BY ALCOHOLIZATION OF FOOD WASTE

CROSS REFERENCE TO RELATED APPLICATION

This application claims the priority of Chinese Patent Application No. 202010893337.5, filed with the China National Intellectual Property Administration on Aug. 31, 2020, which is incorporated herein by reference in its entirety.

Technical Field

The present disclosure is related to the field of the treatment and recycling utilization of organic waste, and in particular to a process for enhanced anaerobic digestion of sludge by alcoholization of food waste.

Background

With the development of society, a very large amount of organic waste is produced in the course of human activities. In China, the productions of food waste and municipal sludge are over 100 and 60 million tons, respectively, every year. Accordingly, how to reasonably treat and dispose these organic waste is a problem that must be addressed in the construction of ecological civilization and in the achievement of sustainable development. Anaerobic digestion (AD) technology is generally regarded as a predominant technology for the treatment of the organic waste. This technology can facilitate volume reduction and stabilization of the organic waste, make them harmless, and realize recycling of valuable resources. Hence, it is considered that the AD process can provide important guarantee for recycling utilization of the organic waste and treatment therefor into a harmless state as well as construction of a zero-waste city. During the AD process of the organic waste, complex organic components contained therein need to be subjected to a series of chemical or biological treatment steps including hydrolysis, acidogenesis, and acetogenesis, so as to be converted to small molecule organic compounds such as acetic acid and ethanol, and are then subjected to a methanogenesis process. The sludge has a compact structure and contains complex components. The sludge also has a low content of organic matter and a low carbon to nitrogen (C/N) ratio. With respect to the AD process of the sludge, there exist problems such as slow beginning stage, low hydrolysis rate, low degradation rate of the organic matter, and poor methane production efficiency. The food waste has a high content of organic matter, especially saccharides. Also, several problems exist with the AD system of the food waste, such as acidification and methanogenesis inhibition.

Synergistic anaerobic co-digestion of the sludge and the food waste is considered as an effective means for balance of the organic components contained therein and the contents thereof and for an enhanced stability of the AD system. Based on this idea, CN 101913747 A (Process for Producing Methane by Co-fermentation of Paper Mill Sludge and Food Waste), CN 102167486 A (Process for Co-treatment of Municipal Sludge, Excrement and Food Waste), CN 102559773 A (Process for Enhanced Biogas Production by the Synergistic Action of Near-simultaneous Fermentation of Multiple Raw Materials), CN 109942161 A (Process for Synergistic Anaerobic Co-digestion of Sludge, Excrement and Food Waste) have been proposed.

However, synergistic anaerobic co-digestion of the sludge and the food waste cannot avoid the occurrence of problems such as low mass-transfer efficiency of the AD system, limited degradation rate of the organic matter, low biogas production efficiency, low methane proportion in the biogas, and long reaction period, which limit further improvement and application of the AD technology for the organic waste including the sludge and the food waste.

Most researchers have focused their efforts on how to enhance the AD of the organic waste and improve the methane production efficiency. In recent years, direct interspecies electron transfer (DIET) between electroactive microorganisms (e.g., *Geobacter* species) and methanogens (e.g., *Methanosaeta* species) via electrically conductive pili and c-type cytochrome or via conductive materials added has been proposed as an efficient pathway for anaerobic methane production from organic matter. Since the DIET requires participation of the electroactive microorganisms and ethanol is currently regarded to be the best of the presently known mediums for the *Geobacter* species which are a widely used type of electroactive microorganism, a promising strategy for establishing and enhancing the DIET in AD of the organic waste is to perform the AD process via ethanol-type fermentation.

Based on this idea, CN 109207345 A (Device and Process for Integrated Anaerobic Digestion of Municipal Sludge and Ethanol-type Fermentation of Corn Stalk), CN 109355164 A (Two-phase Anaerobic Treatment Device and Process for Co-digestion of Food Waste and Ethanol Fermentation Broth of Wheat Straw), CN 109295112 A (Two-phase Anaerobic Treatment Process Based on Co-digestion of Food Waste and Ethanol Fermentation Broth of Corn Stalk), and CN 110818215 A (Two-phase Anaerobic Methane Production Process Using High-solid Content Food Waste and Excess Activated Sludge) have been proposed. However, the straw contains refractory organic compounds such as hemicellulose and lignin, and its fermentation has a low ethanol production efficiency. Moreover, the problems of complex sludge structure and low degradation rate of the organic matter cannot be solved by directly mixing the straw or the food waste having been subjected to ethanol production with the sludge and then subjecting the mixture to the AD process. This limits the application and popularization of the technology.

SUMMARY

An objective of the present disclosure, therefore, is to overcome the problems existing in the prior art, and to provide a process for enhanced anaerobic digestion of sludge, which allows enrichment of electroactive microorganisms via alcoholization of food waste, improved dissolution and degradation properties of the organic matter via pretreatment of the sludge together with a fermentation residue of the food waste, and an increased methane production efficiency.

Accordingly, the above objective of the present disclosure is realized by a process for enhanced anaerobic digestion of sludge by alcoholization of food waste, comprising steps of: (1) ethanol prefermentation of food waste—feeding the food waste having been crushed into a uniform grain size into an ethanol production reactor, where the food waste is subjected to rapid and efficient anaerobic fermentation activated by addition of yeast and pH adjustment to produce ethanol and obtain a fermentation broth and a fermentation residue; (2) sludge pretreatment—feeding the sludge into a pretreatment reactor after mixing with the fermentation residue obtained in the step (1); and (3) methanogenesis of anaerobic digestion—subjecting products resulting from the sludge pretreatment to be mixed with the fermentation broth obtained in the step (1) and then to methanogenesis of anaerobic digestion in a methane production reactor.

Preferably, the food waste is crushed into a grain size smaller than 10 mm before being subjected to the ethanol prefermentation, and mixed thoroughly. This makes it possible to satisfy the requirements for the grain sizes of the food waste before being subjected to the AD process as specified by Industry Standard of the People's Republic of China—Technical Code for Food Waste Treatment (C11184-2012), and also facilitates the subsequent alcoholization process. The yeast added to the ethanol production reactor may be *Saccharomyces cerevisae*, and may be inoculated into the food waste in the reactor via a portion of the fermentation broth resulting from ethanol production in a circular manner. The food waste in the ethanol production reactor may be adjusted to a pH in the range of from 3.5 to 6.5 with a returned portion of the fermentation broth. The activated *Saccharomyces cerevisae* can promote the production of the ethanol from the food waste. Moreover, the pH level of the fermentation broth is suitable for the survival of the yeast. Hence, repeated inoculation of the food waste with the yeast is not needed after periodic acclimation of the yeast.

Preferably, the sludge is one or more of primary sludge, secondary sludge, excess activated sludge, concentrated sludge, dehydrated sludge, and the like from a sewage treatment plant. Preferably, the pretreatment process for the sludge comprises one or more of enzyme, ozone, ultrasonic, and microwave treatments and thermal hydrolysis. Municipal sludge is produced in a large amount, and there are various types of sludge, including primary sludge, secondary sludge, excess activated sludge, and concentrated sludge that have a low solids content, and dehydrated sludge that has a high solids content. The process according to the present disclosure can process various types of sludge with different solids content, and enable the contents of the solids and the organic matter contained in the sludge and the C/N ratio therein to be adjusted to be within a suitable range by combining the sludge with the fermentation residue of the food waste. Further, the various pretreatment techniques can improve dissolution and degradation properties of the organic matter present in the sludge and in the fermentation residue. So, a more suitable medium can be provided for the subsequent step so as to increase the degradation rate of the organic matter and enhance the methanogenesis.

The methanogenesis or methane production process is preferably carried out at a medium temperature of 30 to 40° C., or at a high temperature of 50 to 60° C., or at a medium high temperature of 40 to 50° C. The mixture of the products resulting from the sludge pretreatment and the fermentation broth of the food waste may have a total solid (TS) content within a low range of 2 to 10% or within a high range of 15 to 35%. Methanogens, by which the methanogenesis is conducted, include mesophilic and thermophilic methanogens. The medium temperatures can facilitate the methanogenesis process, while the high temperatures can promote generation of the substrate for producing methane. The medium high temperatures between the medium and high temperatures may achieve both of the effects achieved by the medium temperatures and the high temperatures, and may thus provide a better result. The mixing of the products resulting from the sludge pretreatment and the fermentation broth of the food waste enables adjustment of the solids content and C/N ratio in the methanogenic phase, and can provide abundant substrates including ethanol for the methanogenesis process. This allows enrichment of electroactive microorganisms including *Geobacter* species, and facilitates the establishment and enhancement of the DIET in the AD process. Thus, the methane production efficiency can be increased.

The ethanol prefermentation of the food waste is preferably carried out at 20 to 30° C. for 4 to 48 hours. Compared with traditional methods for inducing the ethanol-type fermentation of organic waste via controlling of temperature and pH level, embodiments of the present disclosure propose to use *saccharomyces* cerevisiae for efficient fermentation of the food waste, which can substantially reduce the fermentation period of the production of ethanol. Moreover, the temperature range of 20 to 30° C. is suitable for growth, reproduction, and metabolism of the yeast. So, efficient and sustainable ethanol prefermentation of the food waste can be realized.

Preferably, a ratio of the TS content in the fermentation residue of the food waste to the TS content in the sludge is 10 to 0.1. The pretreatment reactor is suitable for treating mixtures of the fermentation residue of the food waste with the sludge in various mixing ratios, and enables in each case an improved degradation rate of the organic matter and an increased methane production efficiency in the subsequent anaerobic methanogenesis.

Preferably, the methanogenesis process in the step (3) is carried out with stirring at a stirring speed of 60 to 120 rpm for 10 to 30 days. The methanogenic phase is subjected to efficient anaerobic methanogenesis via the DIET. The period of the methanogenesis varies according to the solids content and the organic content in the feed. The stirring carried out at the above suitable stirring speeds can facilitate mass transfer and reactions involved, increasing the degradation rate of complex organic matter in the sludge and in the food waste, the final production of methane, and the efficiency of the entire AD process.

Preferably, in the step (3), an iron-based or carbon-based conductive material or an iron-carbon composite conductive material is added to the methanogenic phase. The iron-based material may include magnetite, hematite, and goethite. The carbon-based material may include biochar, activated carbon, graphites, graphene, carbon cloth, and carbon nanotubes. The conductive material can facilitate the establishment and enhancement of the DIET pathway, further enhancing the AD of the organic waste.

Preferably, the methane production reactor used in the step (3) is coupled to an electrochemical device which may apply a voltage within the range of 0.1 to 3.0 volts to the methanogenic phase. The applied micro-voltage can effectively facilitate hydrolysis and acidogenesis of the organic waste, enhance the DIET, and improve the methane proportion in the biogas. Accordingly the electrochemical device configured for applying such a micro-voltage to the methanogenic phase can further improve the advantageous effects of the present disclosure.

Compared with the prior art processes, the process for enhanced anaerobic digestion of sludge according to the present disclosure has two critical steps: ethanol prefermentation of the food waste; and the pretreatment of the sludge by mixing the sludge with the fermentation residue of the food waste. The alcoholization of the food waste enables the food waste to be rapidly converted to an ethanol enriched fermentation product, which helps to provide a methanogenic phase enriched in a much larger number of electroactive microorganisms. The pretreatment of the sludge together with the fermentation residue of the food waste makes it possible to degrade the refractory organic matter in the sludge and in the food waste, improving dissolution and degradation properties of the organic matter and further providing a more appropriate substrate and more suitable conditions for the methanogenic phase. Accordingly, the combination of these two steps can substantially increase the methane production rate and the degradation rate of the organic matter. In addition, the conductive material added to the methanogenic phase and the electrochemical device configured for applying a voltage to the methanogenic phase can enhance the DIET in the methane production process and thus the AD of the organic waste.

Compared to prior art processes, the embodiments of the present disclosure provide several advantages.

A new synergistic anaerobic co-digestion process is proposed, which is different from the traditional ones and is specifically optimized for organic waste treatment with one waste treating another.

Food waste alcoholization is combined with sludge pretreatment, which can improve the dissolution and degradation properties of the organic matter in the sludge and in the fermentation residue resulting from the alcoholization of the food waste, and facilitate enrichment of the electroactive microorganisms and degradation of the organic matter.

An appropriate substrate and an efficient microbial community are both allowed to be provided to the methanogenic phase, which can then be subjected to the methane production process in an efficient manner, improving the methane production, the methane proportion in the biogas and the AD efficiency.

The problem existing in the prior art processes that they may be unable to provide high AD efficiency, high methane production, high methane proportion, and high degradation ratio of the organic matter at the same time, is addressed. With the process of the present disclosure, the sludge and the food waste can be treated efficiently via multi-phase reactions, and the resource recovery and biogas quality can be enhanced. The returning of the fermentation broth and circulating inoculation with the yeast allow a reduction in operating cost. So, the process of the present disclosure has a good application prospect and its application may provide a significant economic benefit.

BRIEF DESCRIPTION OF THE DRAWINGS

The accompanying drawing shows a schematic diagram of the process for enhanced anaerobic digestion of sludge by alcoholization of food waste according to the present disclosure.

DETAILED DESCRIPTION

Embodiments of the present disclosure will now be described in detail by way of examples.

Example 1

A dehydrated sludge having a high solids content was subjected to the process for enhanced anaerobic digestion by alcoholization of food waste according to the present disclosure to show the effects thereof on improving degradation rate of the organic matter and the methane yield.

The food waste used was obtained from the Xueyuan canteen of the Tongji University, and had a TS content of 16.78% and a volatile solid (VS) content of 16.33%, with the VS/TS ratio being 97.32%. The dehydrated sludge used was from a sewage treatment plant, and had a TS content of 18.1 to 25.5% and a VS/TS ratio of 46.2 to 68.8%.

After having been crushed into a uniform grain size, the food waste was fed into an ethanol production reactor with an effective volume of 1 liter, and was subjected to ethanol production therein at 25° C. and a pH of 5 for 8 hours. The resulting fermentation residue was mixed with the dehydrated sludge at a VS mass ratio of 2:1, and was then fed into a pretreatment reactor. Thermal hydrolysis was performed in the reactor at 160° C. for 30 minutes to complete the pretreatment of the sludge. The products resulting from the sludge pretreatment were mixed with the fermentation broth resulting from the ethanol production and were then fed into a methane production reactor after pH adjustment to a pH of 6.8 to 7.2.

The methane production reactor had an effective volume of 2 liters. The methane production or methanogenesis was carried out in a water bath at 42° C. with stirring at a stirring speed of 100 rpm in a batch manner. During this, contents of volatile fatty acids (VFAs) were monitored. The biogas production and components were measured every day. The TS and VS contents were also measured before and after the AD process.

Comparative Example 1

Comparative Example 1 followed the process of Example 1 except that the alcoholization of the food waste was not performed. The food waste was mixed with an equal amount of the dehydrated sludge and was subjected to pretreatment and then the synergistic anaerobic co-digestion.

Comparative Example 2

Comparative Example 2 followed the process of Example 1 except that the pretreatment of the sludge was not performed. The food waste having been subjected to the alcoholization was mixed with an equal amount of the dehydrated sludge and was subjected to the synergistic anaerobic co-digestion.

By comparing Comparative Example 1 with Comparative Example 2, it was found that the degradation rate of the organic matter and the total methane production were increased, but the methane production rate and the methane proportion in the biogas were decreased. This showed that the processes in Comparative Examples 1 and 2 each had its own advantages and disadvantages. By comparing Example 1 with Comparative Examples 1 and 2, it was found that the maximum methane production rate was increased from 20.87 ml/(g $VS_{add}$·d) in Comparative Example 1 and 23.28 ml/(g $VS_{add}$·d) in Comparative Example 2 to 30.26 ml/(g $VS_{add}$·d) in Example 1, with the methane production rate increased by 45% and 30% over Comparative Examples 1 and 2, respectively; and the degradation rate of the organic matter was increased from 51.7% in Comparative Example 1 and 49.9% in Comparative Example 2 to 59.5% in Example 1, with the degradation rate of the organic matter increased by 15% and 19% over Comparative Examples 1 and 2, respectively.

Example 2

An excess activated sludge having a low solids content was subjected to the process for enhanced anaerobic digestion by alcoholization of food waste according to the present disclosure to show the effects thereof on improving enrichment of the electroactive microorganisms and the AD efficiency.

The food waste used was obtained from the Xueyuan canteen of the Tongji University, and had a TS content of 14.33% and a VS/TS ratio of 92.15%. The excess activated sludge used was from a sewage treatment plant, and had a TS content of 3.9 to 5.6% and a VS/TS ratio of 50.1 to 65.7%.

After having been crushed into a uniform grain size, the food waste was fed into an ethanol production reactor with an effective volume of 0.5 liters, and was subjected to ethanol production therein at 30° C. and a pH of 4.5 for 4 hours. The resulting fermentation residue was mixed with the excess activated sludge at a VS mass ratio of 1:1, and was then fed into a pretreatment reactor. Ultrasonic processing was performed in the reactor at an output of 250 W and a frequency of 24 kHz for 15 minutes to complete the pretreatment of the sludge. The products resulting from the sludge pretreatment were mixed with the fermentation broth resulting from the ethanol production and were then fed into a methane production reactor after pH adjustment to a pH of 6.8 to 7.2.

Biochar was additionally introduced into the methane production reactor as a conductive material, which can facilitate the establishment and enhancement of the DIET in the AD process. The methane production or methanogenesis was carried out in a water bath at 37° C. with stirring at a stirring speed of 80 rpm in a batch manner. During this, contents of volatile fatty acids (VFAs) in the feed and in the discharge were monitored, and the TS and VS contents therein were measured. The biogas production and components were also measured.

Comparative Example 3

Comparative Example 3 followed the process of Example 2 except that the alcoholization of the food waste was not performed. The food waste was mixed with an equal amount of the excess activated sludge and was subjected to pretreatment and then the synergistic anaerobic co-digestion. The same amount of biochar as in Example 2 was added to the methanogenesis phase.

Comparative Example 4

Comparative Example 4 followed the process of Example 2 except that the pretreatment of the sludge was not performed. The food waste having been subjected to the alcoholization was mixed with an equal amount of the excess activated sludge and was subjected to the synergistic anaerobic co-digestion. The same amount of biochar as in Example 2 was added to the methanogenesis phase.

After the methane production system in Comparative Example 3 became stable, the system was subjected to 16S microbial sequencing and no enrichment of the electroactive microorganisms was found. This showed that the enrichment of the electroactive microorganisms and the establishment of the DIET pathway cannot be realized by simple mixing of the food waste and the sludge. Although the electroactive microorganisms were found in the methane production system in Comparative Example 4, they were in a low relative abundance of only 0.03%. The composition and abundance of the microorganisms in the methane production system in Example 2 showed significant difference compared to Comparative Examples 3 and 4, and the relative abundance of the microorganisms was increased to 20% or greater. With regard to the AD performances, the degradation rate of the organic matter in Example 2 was 62.7%, with an increase of 11% over Comparative Example 4; and the average daily methane production was 113.91 ml/g $VS_{add}$, with an increase of 20% or greater over Comparative Example 4.

Example 3

A mixed sludge having a high solids content was subjected to the process for enhanced anaerobic digestion by alcoholization of food waste according to the present disclosure to show the effects thereof on enhancing methanogenesis in anaerobic sludge digestion and improving the methane proportion in the biogas.

The food waste used was obtained from the Nanyuan canteen of the Tongji University, and had a TS content of 13.71% and a VS/TS ratio of 82.99%. The mixed sludge used was a mixture of secondary sludge and dehydrated sludge from a sewage treatment plant, and had a TS content of 17.3 to 25.2% and a VS/TS ratio of 47.7 to 62.1%.

After having been crushed into a uniform grain size, the food waste was fed into an ethanol production reactor with an effective volume of 4 liters, and was subjected to ethanol production therein at 23° C. and a pH of 4.3 for 10 hours. The resulting fermentation residue was mixed with the mixed sludge at a VS mass ratio of 2:1, and was then fed into a pretreatment reactor. Enzyme (protease and carbohydrase) treatment was performed in the reactor to complete the pretreatment of the sludge. The products resulting from the sludge pretreatment were mixed with the fermentation broth resulting from the ethanol production and were then fed into a methane production reactor after pH adjustment to a pH of 6.8 to 7.2.

A microbial electrolysis cell, composed of iron and carbon electrodes, was coupled to the methane production reactor, and was used for applying a micro-voltage of 0.6 volts to the methanogenesis phase, which can facilitate hydrolysis and acidogenesis of the organic waste, enhance the DIET and improve the methane proportion in the biogas. The methane production or methanogenesis was carried out in a water bath at 47° C. with stirring at a stirring speed of 90 rpm in a batch manner. During this, contents of volatile fatty acids (VFAs) in the feed and the discharge were monitored, and the TS and VS contents therein were measured. The biogas production and components were also measured.

Comparative Example 5

Comparative Example 5 followed the process of Example 3 except that the alcoholization of the food waste was not performed. The food waste was mixed with an equal amount of the mixed sludge and was subjected to pretreatment and then the synergistic anaerobic co-digestion. The same electrochemcial device as in Example 3 was used and the same voltage was applied to the methanogenesis phase.

Comparative Example 6

Comparative Example 6 followed the process of Example 3 except that the pretreatment of the sludge was not performed. The food waste having been subjected to the alcoholization was mixed with an equal amount of the mixed sludge and was subjected to the synergistic anaerobic co-digestion. The same electrochemcial device as in Example 3 was used and the same voltage was applied to the methanogenesis phase.

Results of Comparative Examples 5 and 6 showed that, when the micro-voltage (0.6 volts) was applied to the methanogenesis phase, the biogas production rate was increased, but the methane proportion in the biogas had no appreciable change. As a comparison, results of Example 3 showed that, when the micro-voltage (0.6 volts) was applied to the methanogenesis phase, the biogas production rate was increased substantially, and the methane proportion in the biogas was increased gradually. After the methane production systems in Example 3, and in Comparative Examples 5 and 6 became stable, the system in Example 3 provided a methane production rate of 152.15 mL/(g $VS_{add}$·d), with an increase of 18% and 22% compared to the methane production rate of 128.91 mL/(g $VS_{add}$·d) in Comparative Example 5 and the methane production rate of 124.71 mL/(g $VS_{add}$·d) in Comparative Example 6, respectively. It was also found that the biogas produced in Example 3 had a methane proportion of 87.1%, with an increase of 19% and 12% compared to the methane proportion of 73.2% in Comparative Example 5 and the methane proportion of 77.8% in Comparative Example 6, respectively.

The above description of exemplary embodiments of the present disclosure is provided to enable those skilled in the art to understand and practice the present disclosure. It will be apparent to those skilled in the art that various modifications can be made to these exemplary embodiments and the general principles described herein may be applied to other embodiments without creative efforts. Therefore, the present disclosure is not intended to be limited to the above embodiments, and various modifications and improvements made without departing from the spirit of the present disclosure are also included in the scope as defined by the appended claims.

What is claimed is:

1. A process for enhanced anaerobic digestion of sludge by alcoholization of food waste, comprising steps of:
   (1) ethanol prefermentation of food waste—feeding the food waste having been crushed into a uniform grain size into an ethanol production reactor, where the food waste is subjected to anaerobic fermentation activated by addition of yeast and pH adjustment to produce ethanol and obtain a fermentation broth and a fermentation residue;
   (2) pretreatment of sludge—feeding the sludge into a pretreatment reactor after mixing with the fermentation residue obtained in the step (1) for pretreatment so that dissolution and degradation properties of organic matter contained in the sludge and in the fermentation residue are improved; and
   (3) methanogenesis of anaerobic digestion—subjecting products resulting from the step (2) to be mixed with the fermentation broth obtained in the step (1) and then to methanogenesis of anaerobic digestion in a methane production reactor.

2. The process according to claim 1, wherein, in the step (1), the food waste is crushed into a grain size smaller than 10 mm before being subjected to the ethanol prefermentation, and mixed thoroughly; and, wherein, the yeast added is *Saccharomyces cerevisae*, and is inoculated into the food waste in the ethanol production reactor via a portion of the fermentation broth resulting from the ethanol production in a circular manner; and, wherein, the food waste in the ethanol production reactor is adjusted to a pH in the range of from 3.5 to 6.5 with a returned portion of the fermentation broth.

3. The process according to claim 1, wherein, in the step (1), the ethanol prefermentation of the food waste is carried out at 20 to 30° C. for 4 to 48 hours.

4. The process according to claim 1, wherein, in the step (2), a ratio of a total solids content in the fermentation residue of the food waste to a total solids content in the sludge is 10 to 0.1.

5. The process according to claim 1, wherein, the sludge in the step (2) is at least one of: primary sludge, secondary sludge, excess activated sludge, concentrated sludge, and dehydrated sludge from a sewage treatment plant; and, wherein, the pretreatment of the sludge comprises at least one of enzyme, ozone, ultrasonic, microwave treatments, and thermal hydrolysis.

6. The process according to claim 1, wherein, the methanogenesis in the step (3) is carried out with stirring at a stirring speed of 60 to 120 rpm for 10 to 30 days.

7. The process according to claim 1, wherein, the methanogenesis in the step (3) is carried out at a medium temperature of 30 to 40° C., or at a high temperature of 50 to 60° C., or at a medium high temperature of 40 to 50° C.; and, wherein, the mixture of the products resulting from the sludge pretreatment and the fermentation broth of the food waste has a total solid content within a low range of 2 to 10% or within a high range of 15 to 35%.

8. The process according to claim 1, wherein, in the step (3), an iron-based or carbon-based conductive material or an iron-carbon composite conductive material is added to the methane production reactor.

9. The process according to claim 8, wherein, the iron-based material comprises at least one of: magnetite, hematite, and goethite; and, wherein, the carbon-based material comprises at least one of: biochar, activated carbon, graphites, graphene, carbon cloth, and carbon nanotubes.

10. The process according to claim 1, wherein, in the step (3), the methane production reactor is coupled to an electrochemical device which is configured for applying a voltage within the range of 0.1 to 3.0 volts to a methanogenic phase.

* * * * *